(12) United States Patent
Bhagavathy et al.

(10) Patent No.: US 9,020,259 B2
(45) Date of Patent: Apr. 28, 2015

(54) METHOD FOR DETECTING AND ADAPTING VIDEO PROCESSING FOR FAR-VIEW SCENES IN SPORTS VIDEO

(75) Inventors: Sitaram Bhagavathy, Plainsboro, NJ (US); Dong-Qing Zhang, Plainsboro, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 97 days.

(21) Appl. No.: 13/383,626

(22) PCT Filed: Jul. 19, 2010

(86) PCT No.: PCT/US2010/002028
§ 371 (c)(1),
(2), (4) Date: Jan. 12, 2012

(87) PCT Pub. No.: WO2011/011052
PCT Pub. Date: Jan. 27, 2011

(65) Prior Publication Data
US 2012/0121174 A1    May 17, 2012

Related U.S. Application Data

(60) Provisional application No. 61/271,381, filed on Jul. 20, 2009.

(51) Int. Cl.
*G06K 9/00* (2006.01)
*G06T 5/00* (2006.01)

(52) U.S. Cl.
CPC ............. *G06K 9/00711* (2013.01); *G06T 5/00* (2013.01); *G06T 2207/20004* (2013.01); *G06T 2207/10016* (2013.01); *G06T 2207/30228* (2013.01); *G06K 9/00684* (2013.01); *G06K 9/00724* (2013.01)

(58) Field of Classification Search
USPC .......... 382/165–172, 181, 190, 205–206, 224
See application file for complete search history.

(56) References Cited

U.S. PATENT DOCUMENTS 6,842,197 B1 * 1/2005 Llach-Pinsach et al. ..... 348/700
7,006,945 B2 * 2/2006 Li ................................. 702/181
(Continued)

FOREIGN PATENT DOCUMENTS

CN       101465003       6/2009
EP       1043664         10/2000
(Continued)

OTHER PUBLICATIONS

Chang, W. et al: "Template-Based Scene Classification for Baseball Videos Using Efficient Playfield Segmentation", Third International Conference on Intelligent information 2007; Hiding and Multimedia Signal Processing. IEEE Computer Society.
(Continued)

*Primary Examiner* — Li Liu
(74) *Attorney, Agent, or Firm* — Robert D. Shedd; Kuniyuki Akiyama

(57) ABSTRACT

A method is disclosed for analyzing video to detect far-view scenes in sports video to determine when certain image processing algorithms should be applied. The method comprises analyzing and classifying the fields of view of images from a video signal, creating and classifying the fields of view of sets of sequential images, and selectively applying image processing algorithms to sets of sequential images representing a particular type of field of view.

16 Claims, 7 Drawing Sheets

(56) References Cited

U.S. PATENT DOCUMENTS

| | | | |
|---|---|---|---|
| 7,199,798 B1 | 4/2007 | Echigo et al. | |
| 8,184,947 B2* | 5/2012 | Murabayashi et al. | 386/242 |
| 8,326,042 B2* | 12/2012 | Wu et al. | 382/190 |
| 2001/0017887 A1 | 8/2001 | Furukawa et al. | |
| 2002/0028021 A1* | 3/2002 | Foote et al. | 382/224 |
| 2002/0159637 A1 | 10/2002 | Echigo et al. | |
| 2003/0179294 A1 | 9/2003 | Martins | |
| 2004/0090453 A1* | 5/2004 | Jasinschi et al. | 345/723 |
| 2004/0130567 A1 | 7/2004 | Ekin et al. | |
| 2006/0026628 A1* | 2/2006 | Wan et al. | 725/32 |
| 2006/0061602 A1 | 3/2006 | Schmouker et al. | |
| 2007/0242088 A1 | 10/2007 | Kim et al. | |
| 2007/0263723 A1 | 11/2007 | Segiguchi et al. | |
| 2007/0281331 A1 | 12/2007 | Koo et al. | |
| 2008/0235318 A1 | 9/2008 | Khosla et al. | |
| 2009/0083790 A1* | 3/2009 | Wang et al. | 725/38 |
| 2009/0147992 A1 | 6/2009 | Tong et al. | |
| 2009/0196492 A1* | 8/2009 | Jung et al. | 382/154 |
| 2010/0027840 A1 | 2/2010 | Roberts et al. | |
| 2010/0034425 A1 | 2/2010 | Lin et al. | |
| 2010/0098307 A1 | 4/2010 | Huang et al. | |
| 2011/0026606 A1 | 2/2011 | Bhagavathy et al. | |
| 2011/0243417 A1 | 10/2011 | Madabhushi et al. | |
| 2012/0114184 A1 | 5/2012 | Barcons-Palau et al. | |

FOREIGN PATENT DOCUMENTS

| | | |
|---|---|---|
| EP | 1501313 | 1/2005 |
| EP | 1515448 | 3/2008 |
| JP | 2000069420 | 3/2000 |
| JP | 2000293543 | 10/2000 |
| JP | 2001245303 | 8/2001 |
| JP | 2002281506 | 9/2002 |
| JP | 2003264757 | 9/2003 |
| JP | 2005182402 | 7/2005 |
| JP | 2005260501 | 9/2005 |
| JP | 2006087098 | 3/2006 |
| JP | 2007101867 | 4/2007 |
| JP | 2007233798 | 9/2007 |
| JP | 2010507327 | 3/2010 |
| JP | 2010522926 | 7/2010 |
| KR | 20080075986 | 8/2008 |
| KR | 871012 | 11/2008 |
| WO | WO0045335 | 8/2000 |
| WO | WO 2007/045001 | 4/2007 |
| WO | WO2008048268 | 4/2008 |
| WO | WO2008118147 | 10/2008 |
| WO | 2009/067170 A1 | 5/2009 |
| WO | WO 2009/067170 | 5/2009 |
| WO | 2010/083018 A1 | 7/2010 |
| WO | WO2011011059 | 1/2011 |

OTHER PUBLICATIONS

Delannay, D. et al: "Detection and Recognition of Sports (wo)men from Multiple Views,"; Third ACM/IEEE International Conference on Distributed Smart Cameras (ICDSC) 2009.

Ekin, A. et al: "A Framework for Tracking and Analysis of Soccer Video ", Visual Communications and Image Processing, 2002. Proceedings of SPIE, vol. 4671.

Kolekar, M. et al: "A Hierarchical Framework for Semantic Scene Classification in Soccer Sports Video,". TENCON 2008, IEEE Region 10 Conference 2008.

Liang, D. et al: "Video2Cartoon:A System for Converting Broadcast Soccer Video into 3D Cartoon Information", IEEE Transactions ion Consumer Electronics, vol. 53, No. 3, Aug. 2007.

Marpe, D. et al: "Contect-Based Adaptive Binary Arithmetic Coding in the H.264/AVC Video Compression Standard", IEEE Transactions on Circuits and Systems for Video Technology, vol. 13, No, 7, Jul. 2003.

Morioka, K. et al: "Seamless Object Tracking in Distributed Vision Sensor Vision", SICE Annual Conference in Sapporo, Aug. 4-6, 2004. Hokkaido institute of Technology, Japan.

Pei, C. et al: "A Real Time Ball Detection Framework for Soccer Video", Sixteenth International Conference on Systems, Signals and Image Processing, IEEE, 2009.

Phillips, P. et al: "Object Identification and Registration via Sieve Processes", Signal ProcessingSensor Fusion and Target Recognition, SPIE vol. 2755.

Ren, J. et al: "Tracking the Soccer Ball Using Multiple Fixed Cameras", Computer Vision and Image Understanding, 2009.

Sadlier, D. et al: "A Combined Audio-Visual Contribution to Event Detection in Field Sports Broadcast Video. Case Study: Gaelic Football",. Signal Processing & Information Tech., 2003. ISSPIT 2003. Proceed. of the $3^{rd}$ Int'l Symp. in Darmstadt DE. Dec. 14-17, 2003.

Tong, X. et al: "A Three-Level Scheme for Real-Time Ball Tracking", MCMS 2007, LNCS 4577, pp. 161-171, 2007; Springer-Verlag Berlin, Heidekberg 2007.

ITU-T H.264 Series H: Audiovisual and Multimedia Systems. (Infrastructure of audiovisual services-Coding of moving video): Advanced video coding for generic audiovisual services, 2005.

Search Reportg Nov. 4, 2010.

Kaveh Kangarloo, et al., "Grass Field Segmentation The First Step toward Player Tracking, Deep Compression and Content Based Football Image Retrieval", International Workshop on Systems, Signals and Image Processing, Sep. 13-15, 2004, pp. 131-134.

Youness Tabii, et al., "A New Method for Video Soccer Shot Classification", VISAPP 2007—International Conference on Computer Vision Theory and Applications, pp. 221-224.

Jinjun Wang, et al., "Soccer Replay Detection Using Scene Transition Structure Analysis", ICASSP IEEE 2005, pp. 433-436.

Fei Yan, et al., "Layered Data Association Using Graph-Theoretic Formulation with Applications to Tennis Ball Tracking in Monocular Sequences", IEEE Transactions on Pattern Analysis and Machine Intelligence, vol. 30, No. 10, Oct. 2008, pp. 1814-1830.

Xinguo Yu, et al., "Trajectory-Based Ball Detection and Tracking in Broadcast Soccer Video", IEEE Transactions on Multimedia, vol. 8, No. 6, Dec. 2006, pp. 1164-1178.

ITU-T H.264, "Series H: Audiovisual and Multimedia Systems Infrastructure of Audiovisual Services-Coding of Moving Video", ITU-T Recommendation H. 264, Mar. 2005, 343 pgs.

Non-Final Office Action for related U.S. Appl. No. 13/386,145 dated Oct. 11, 2013.

PCT Search Report for related application PCT/US2010/002039 dated Nov. 4, 2010.

China Search Report dated Dec. 18, 2013.

* cited by examiner

400

410

420

430

440

450

METHOD FOR DETECTING AND ADAPTING VIDEO PROCESSING FOR FAR-VIEW SCENES IN SPORTS VIDEO

CROSS REFERENCE TO RELATED APPLICATION

This application claims benefit, under 35 U.S.C. §365 of International Application PCT/US2010/002028, filed Jul. 19, 2010 which was published in accordance with PCT article 21(2) on Jan. 27, 2001 in English and which claims the benefit of U.S. provisional patent application No. 61/271,381 filed Jul. 20, 2009.

BACKGROUND OF THE INVENTION

The present invention generally relates to a method and associated apparatus for analyzing video to detect far-view scenes in sports video to determine when certain image processing algorithms should be applied. The method comprises analyzing and classifying the fields of view of images from a video signal, creating and classifying the fields of view of sets of sequential images, and selectively applying image processing algorithms to sets of sequential images representing a particular type of field of view.

This section is intended to introduce the reader to various aspects of art, which may be related to various aspects of the present invention that are described below. This discussion is believed to be helpful in providing the reader with background information to facilitate a better understanding of the various aspects of the present invention. Accordingly, it should be understood that these statements are to be read in this light, and not as admissions of prior art.

As mobile devices have become more capable and mobile digital television standards have evolved, it has become increasingly practical to view video programming on such devices. The small screens of these devices, however, present some limitations, particularly for the viewing of sporting events. Small objects, such as the ball in a sporting event, can be difficult to see. The use of high video compression ratios can exacerbate the situation by significantly degrading the appearance of small objects like a ball in a far-view scene.

It is possible to enhance the appearance of these objects, but such algorithms may be computationally costly or degrade the overall image quality if applied when not needed. It would be desirable to be able to detect particular types of scenes that could benefit from object enhancement algorithms such that the algorithms may be selectively applied. The invention described herein addresses this and/or other problems.

SUMMARY OF THE INVENTION

In order to solve the problems described above, the present invention concerns analyzing video to detect far-view scenes in sports video to determine when certain image processing algorithms should be applied. The method comprises analyzing and classifying the fields of view of images from a video signal, creating and classifying the fields of view of sets of sequential images, and selectively applying image processing algorithms to sets of sequential images representing a particular type of field of view. This and other aspects of the invention will be described in detail with reference to the accompanying drawings.

BRIEF DESCRIPTION OF THE DRAWINGS

The above-mentioned and other features and advantages of this invention, and the manner of attaining them, will become more apparent, and the invention will be better understood, by reference to the following description of embodiments of the invention taken in conjunction with the accompanying drawings, wherein.

The exemplifications set out herein illustrate preferred embodiments of the invention. Such exemplifications are not to be construed as limiting the scope of the invention in any manner.

DESCRIPTION OF THE PREFERRED EMBODIMENTS

As described herein, the present invention provides a method and associated apparatus for analyzing video to detect far-view scenes in sports video to determine when certain image processing algorithms should be applied. The method comprises analyzing and classifying the fields of view of images from a video signal, creating and classifying the fields of view of sets of sequential images, and selectively applying image processing algorithms to sets of sequential images representing a particular type of field of view.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

In a preferred embodiment, the present invention may be implemented in signal processing hardware within a television production or transmission environment. The method is used to detect far-view scenes in sports video, with an exemplary application in soccer video. Far-view scenes are those corresponding to wide-angle camera views of the play field, wherein the objects of interest, for instance, the players and ball, are small enough to be easily degraded by video compression or not be clearly visible.

Figure 1:
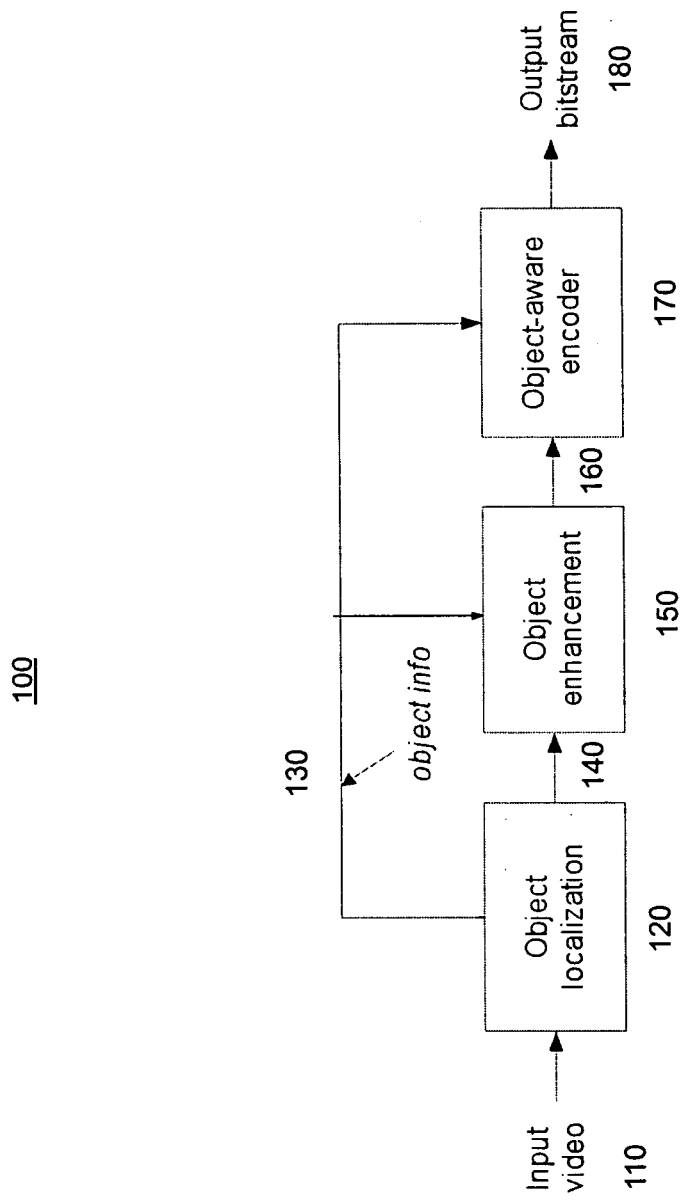
FIG. 1 is a diagram of a prior art video processing system with object localization and enhancement.

FIG. 1 illustrates a conventional image processing system 100 with object localization and enhancement applied to all portions of a video, regardless of the field of view of a particular scene. Input video 110 is first processed through object localization algorithms 120 to produce information 130 about detected objects, such as balls or pucks. Various techniques are known in the art for detecting such objects, such as the use of filters corresponding to characteristics of the object of interest.

Information 130 about the identified objects is passed to the object enhancement stage 150 and to an object aware encoder 170. This information may include, for instance, location, size, trajectory, or a mask of a ball. Video frames 140 are processed at object enhancement stage 150 using the information 130 about the identified objects. For instance, a highlight color may be placed over the location of a ball or puck to allow the viewer to more easily identify its location.

The resulting video frames 160 with enhancement applied to the detected objects are then encoded by the object-aware encoder 170, resulting in an output bitstream 180. The use of object information 130 by the object-aware encoder 170 may allow the encoding to be adjusted to preserve the visibility and appearance of identified objects in the far-view scenes, such as players or the ball. For instance, a lower compression ratio may be used for scenes in which the ball appears as a small object, or for particular areas of frames where the ball appears.

In a system like system 100, object localization and enhancement are performed without regard to the type of view represented in the frames being processed. Thus, unnecessary processing is performed on some types of scenes, potentially resulting in wasted time, wasted processing resources, or image quality degradation.

Figure 2:
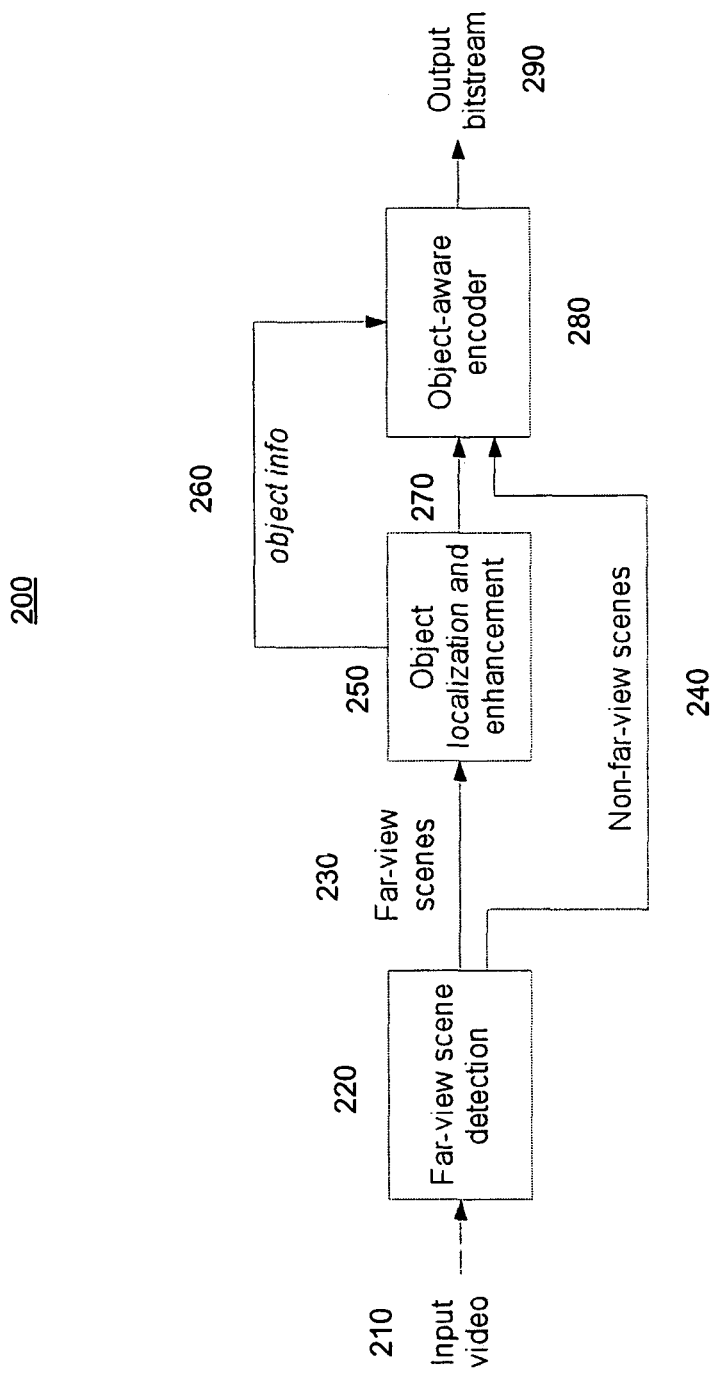
FIG. 2 is a diagram of a video processing system with object localization and enhancement utilizing far-view scene detection.

FIG. 2 illustrates the data flow in a video processing system in accordance with the present invention. The input video 210 is first processed by a far-view scene detection algorithm 220, which will be described in detail below. With the addition of far-view scene detection 220, the scenes 230 classified as far-view may then be processed separately from those scenes 240 classified as not being far-view. This may provide savings in time, savings of processing resources, or improvements in image quality.

Far-view scenes 230 are sent to object localization and enhancement processing 250. This processing may include highlighting of a detected ball, illustration of a ball trajectory, or other enhancements. Non-far-view scenes 240 bypass the object localization and enhancement stage and are sent directly to the object-aware encoder 280. Object information 260 produced by the object localization and enhancement stage 250 and the enhanced far-view scenes 270 are also sent to the object-aware encoder 280, which produces an encoded output bitstream 290.

As described earlier, the use of object information 260 by the object-aware encoder 280 allows the encoding to be adjusted, for instance, to preserve the visibility and appearance of identified objects, such as soccer balls, in the far-view scenes. For instance, a lower compression ratio may be used for scenes in which the ball appears, or for particular areas of frames where the ball appears.

The detection of far-view scenes of step 220 comprises the following stages:
1. Classification of each frame in the sequence as far-view (FV), maybe far-view (MFV), or not far-view (NFV), described below with respect to FIG. 3.
2. Segmentation of the sequence into a number of chunks, each chunk being a contiguous set of "similar-looking" frames, described below with respect to FIG. 5.
3. Classification of each chunk as FV, MFV, or NFV, described below with respect to FIG. 6.
4. Detection of far-view scenes by merging and reclassifying chunks, described below with respect to FIG. 7.

Figure 3:
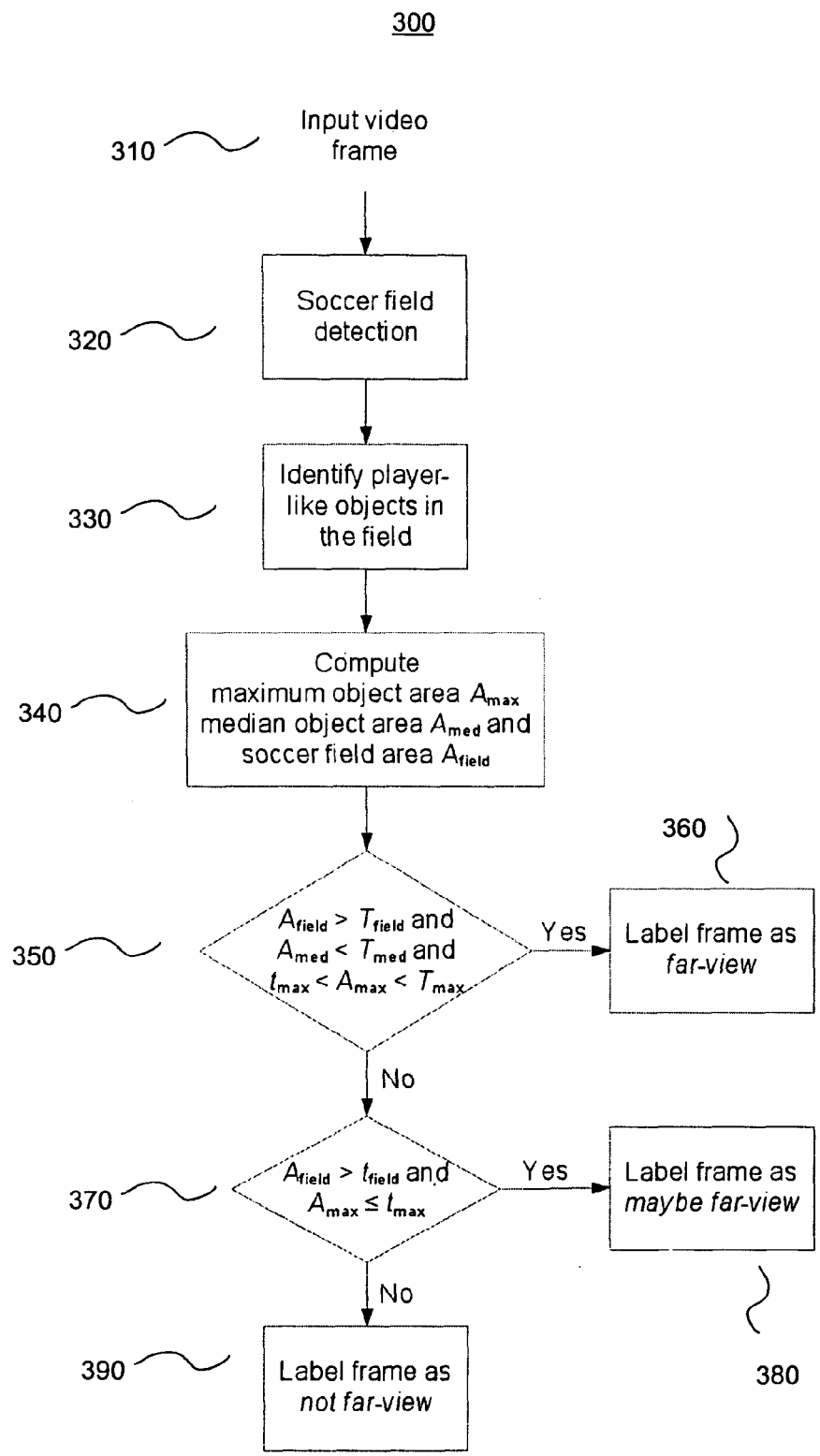
FIG. 3 is a flowchart of a method for classifying the field of view represented by a frame.

FIG. 3 is a flowchart of a method 300 of far-view frame classification, described with respect to an exemplary application of soccer video. An input frame 310 from a soccer video is processed into a binary field mask at a soccer field detection step 320. In a simple case, the soccer field pixels are identified using the knowledge that the field is generally covered in grass or grass-colored material. The result is a binary mask classifying all field pixels with a value of 1 and all non-field pixels, including objects in the field, with a value of 0. Various image processing techniques may then be used to then identify the boundaries of the playing field, ignore foreground objects, and create a solid field mask. For instance, all pixels within a simple bounding box encompassing all of the contiguous regions of field pixels above a certain area threshold may be included in the field mask. Other techniques, including the use of filters, may be used to identify the field and eliminate foreground objects from the field mask.

At step 330, "player-like" objects are identified through analysis of the foreground objects, which are connected sets of non-field pixels within the field boundary identified in step 320. For a foreground object o with constituent pixels $\{(x_i, y_i)\}$, the following object parameters are computed:

area:

$$a_o = \sum_i 1,$$

(i.e., the number of pixels in the object), height:

$$h_o = \max_i y_i - \min_i y_i + 1,$$

width:

$$w_o = \max_i x_i - \min_i x_i + 1,$$

compactness: $c_o = a_o/(h_o \times w_o)$, and
aspect ratio: $r_o = h_o/w_o$.

Objects are considered "player-like" when the area, compactness, and aspect ratio each exceed a threshold related to known characteristics of players in a soccer video. Stated otherwise, if $(a_o > t_a)$, $(c_o > t_c)$, and $(r_o > t_r)$, the object o is considered "player-like." In a preferred embodiment directed toward 320×240-pixel soccer videos, the threshold values of $t_a=10$, $t_c=0.1$, and $t_r=0.5$ are used.

At step 340, the maximum area $A_{max}$ and median area $A_{med}$ of all player-like objects are computed. As described above, the area of a particular object may be computed simply as the number of pixels comprising the object. Likewise, the area of the field $A_{field}$ may be computed as the number of pixels comprising the field mask.

At step 350, the area of the field, the median area of player objects, and the maximum area of player objects are compared to thresholds related to the expected areas in a far-view scene. If $(A_{field} > T_{field})$, $(A_{med} < T_{med})$, and $(t_{max} < A_{max} < T_{max})$, the frame is labeled as FV at step 360. That is, if the field area in the frame is large, the median player area is small, and the maximum player area is within an expected range, the field-of-view of the scene is wide, or far.

If the frame is not labeled as FV, further determinations are made as to whether the frame may be far view, or is most likely not far view. The frame is classified as MFV at step 380 if the criteria $(A_{field} > t_{field})$ and $(A_{max} \le t_{max})$ are met at step 370. Stated otherwise, if the field area is above a lower threshold, but the maximum area of a player-like object is not above a minimum threshold, a reliable determination cannot be made based upon the single frame. If the frame is not labeled as FV or MFV, it is classified as NFV at step 390.

In a preferred embodiment directed toward 320×240-pixel soccer videos, the threshold values of $T_{field}=0.4\times H\times W$ (40% of the frame area), $t_{field}=0.3\times H\times W$ (30% of the frame area), $T_{med}=600$, $t_{max}=100$, and $T_{max}=2400$, were used, where H and W are the height and width of the frame in pixels.

The steps of method 300 are repeated for each frame in the sequence. Thus, a sequence of classifications of field of view, one per frame, is obtained.

Figure 4:
FIG. 4 is an illustration of the results of applying portions of a method for classifying the field of view represented by a frame.
Figure 4:
Figure 4:
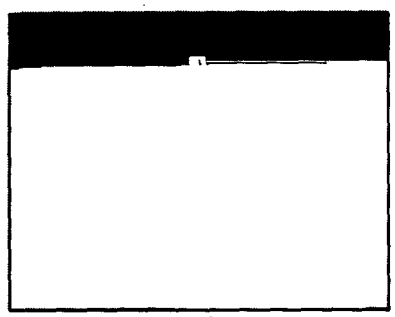
Figure 4:
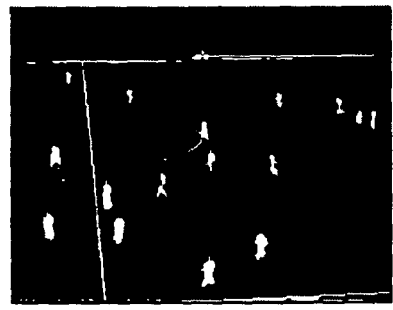
Figure 4:
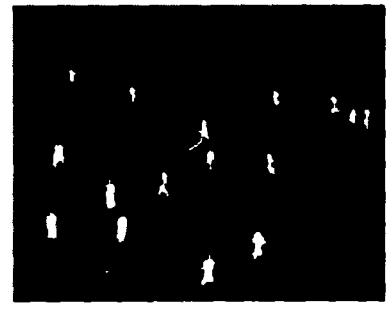

FIG. 4 illustrates the field detection and player-like object detection processes of steps 320 and 330. Given a frame 410, the soccer field detection first results in a binary mask 420, classifying all field-colored pixels with a value of 1 and all non-field pixels, including objects in the field, with a value of 0. Objects on the field, such as players, lines, and the ball, appear as holes in the mask since they are not the expected color of the field. The result of the determination of the boundaries of the soccer field is shown in 430. The holes in the mask from players, lines, and the ball are removed, creating a large contiguous field mask. Image 440 shows the detected foreground objects, the connected sets of non-field pixels within the field boundaries shown in 430. These include, for instance, binary masks of players, field lines, and the ball. Image 450 represents the result of the detection of player-like objects. Objects not meeting the thresholds for area, compactness, or aspect ratio, such as the field lines, have been eliminated.

The frame-level classification of method 300 will generally produce some erroneous frame classifications. In order to mitigate the effects of such errors, the video is segmented into sets of contiguous "similar-looking" frames called "chunks." The process of identifying chunks is described below with respect to FIG. 5. The field of view of each chunk is then classified as a whole based on the statistics of the classifications of its constituent frames, as described below with respect to FIG. 6.

Figure 5:
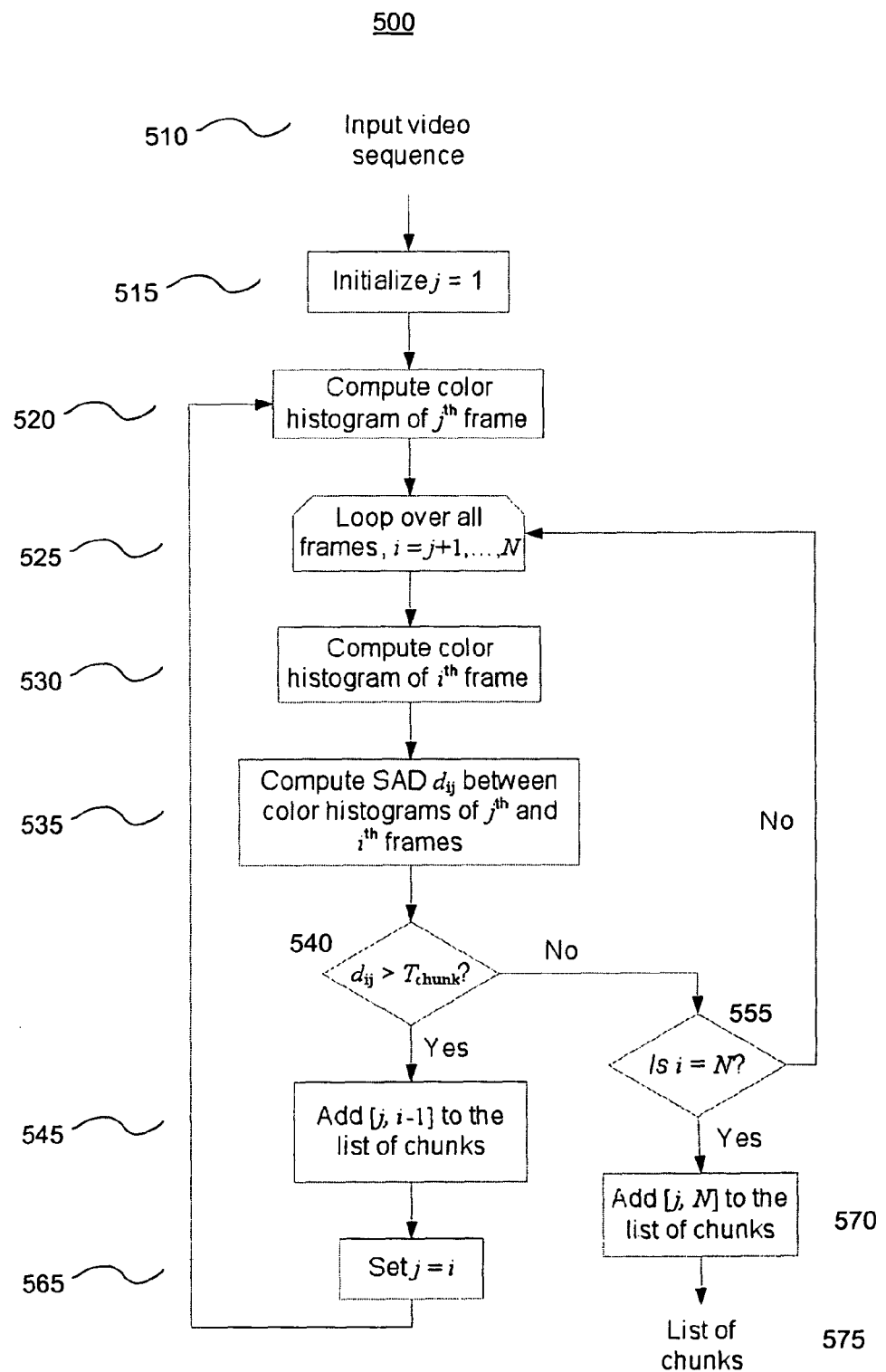
FIG. 5 is a flowchart of a method of segmenting a video sequence into chunks.

FIG. 5 outlines a method 500 used for segmenting a video sequence 510 into a number of chunks based upon similarity of color histograms of contiguous sequences of frames. A color histogram consists of counts of the number of pixels in the frame within various ranges of color values. Frames from the same scene are likely to have similar histograms, as the camera will be pointed at the same objects, which generally have constant color. A change of scene will place different objects of different colors within the field of view, thereby generally changing the color histogram.

At step 515, the list of chunks C is empty. The starting frame number j, the first frame in the chunk under construction, is initialized to a value of 1, the first frame in the video sequence.

At step 520, the color histogram of the $j^{th}$ frame is computed. In a preferred embodiment, $H_j$ is a 256-bin histogram of grayscale values of pixels in frame j. A smaller number of larger histogram bins may be utilized to reduce the computational intensity of histogram comparison. The color histogram of the $j^{th}$ frame serves as a basis for assembly of the chunk.

At step 525, a loop begins for frames i=j+1, ..., N, where N is the number of the last frame in the sequence. The frames following frame j will be analyzed one at a time for similarity to frame j to determine if they should be included in the chunk that begins with frame j.

At step 530, the color histogram $H_j$ of the $i^{th}$ frame is computed using the same technique used at step 520. Then at step 535, the histogram difference between the $i^{th}$ frame and the $j^{th}$ frame, $d_{ij}$ is computed. The difference may be computed as $d_{ij}=\|H_i-H_j\|_1$, where $\|\cdot\|_1$ refers to the 1-norm or sum of absolute differences (SAD) between two vectors.

At step 540, a determination is made based on the difference $d_{ij}$ from step 535 as to whether the color histogram of frame i is similar enough to that of frame j for frame i to be included in the chunk beginning with frame j. The frames are considered similar enough if the distance $d_{ij}$ between their color histograms $H_j$ and $H_j$ is below a threshold $T_{chunk}$. In a preferred embodiment, $T_{chunk}=0.4$.

If $d_{ij}>T_{chunk}$, that is, if the color histogram difference of frame i from frame j is too large for frame i to be included in the chunk, the interval [j, i−1] is added to the list of chunks at step 545. Thus, the current chunk is terminated at the previous frame, frame i−1, the last frame meeting the similarity threshold. The starting frame number j for the new chunk is set to the current value of i at step 565, and the process returns to step 520 for building of the next chunk.

However, if $d_{ij}$ is less than or equal to $T_{chunk}$, the frame i is considered similar enough to the initial frame of the chunk, j, to be added to the current chunk. A determination is then made at step 555 as to whether i=N (i.e., the last frame in the video has been reached). If not, the process returns to the beginning of the loop at step 525 and the next frame is considered for inclusion in the current chunk.

The ending frame number of the chunk under construction is thereby increased until either a sufficiently dissimilar frame is located or until the last frame is reached. If the last frame has been reached, that is, i=N, the interval [j N] consisting of the final frames is added to the list of chunks 575 at step 570 and the process terminates.

At the end of this process, a list of chunks C has been produced. Each chunk is represented by a pair [b e], where b is the beginning frame of the chunk and e is the ending frame.

Figure 6:
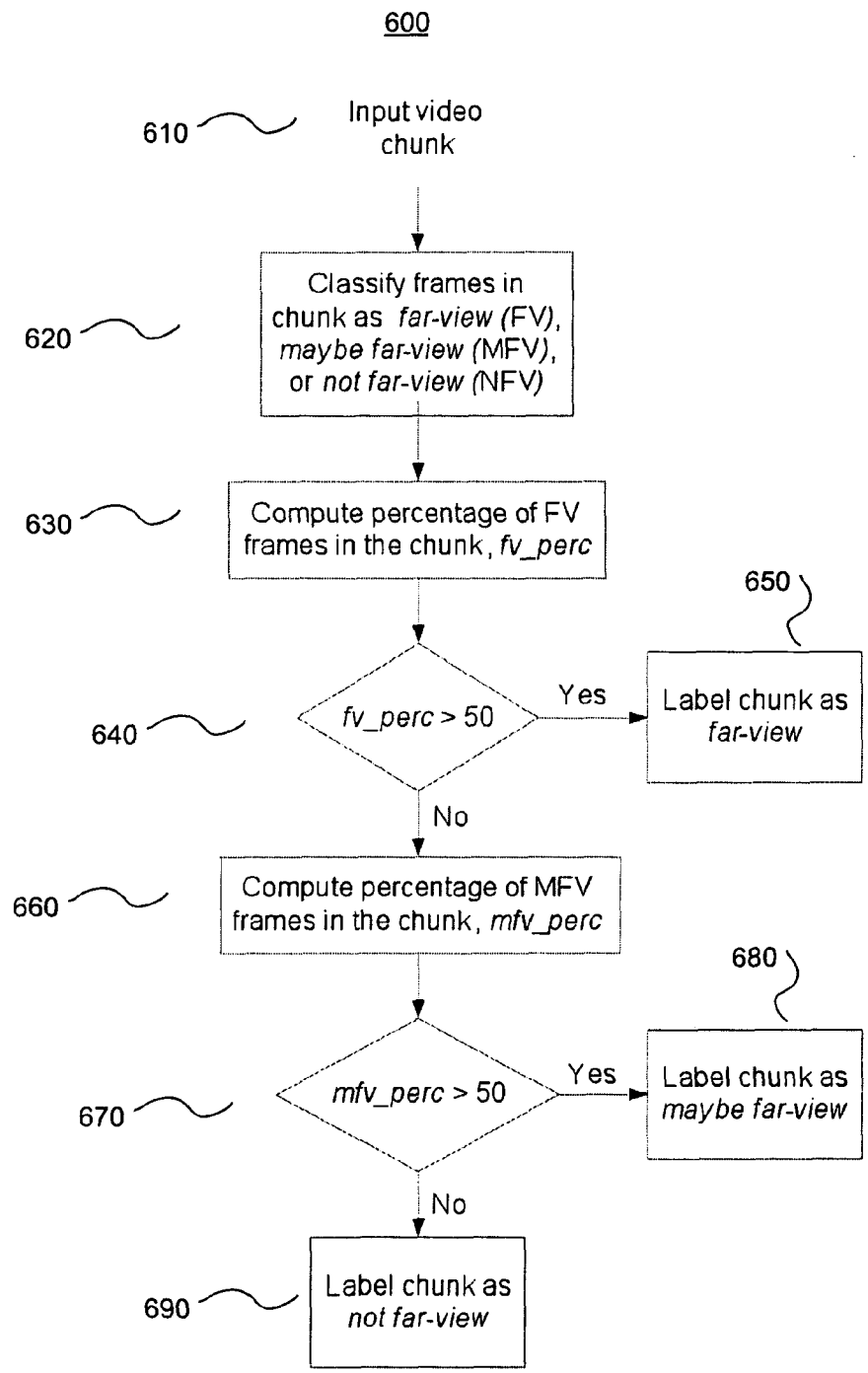
FIG. 6 is a flowchart of a method of classifying the field of view of a chunk of a video sequence.

FIG. 6 shows the method 600 used to classify the field of view of each chunk as FV, MFV, or NFV. In a preferred embodiment, chunk classification is based on a strict form of majority voting among the labels of the frames in the chunk, mitigating labeling errors that occurred in the frame-level classification.

At step 620, each frame of the input video chunk 610 is classified as FV, MFV, or NFV. This frame-level classification may be performed using method 300 described above.

At step 630, the percentage of FV frames is computed for the chunk. If more than 50% of the frames in the chunk are determined to be FV at step 640, the whole chunk is classified as FV at step 650. That is, if the majority of constituent frames are far view, the chunk is considered far view.

If the percentage of FV frames is not above 50%, the percentage of MFV frames in the chunk is computed at step 660. If more than 50% of frames are determined to be MFV at step 670, the chunk is classified as MFV at step 680. If neither criterion is satisfied, the chunk is classified as NFV at step 690. In an alternative embodiment, chunks may be classified as NFV if the frame count is below a certain threshold.

Figure 7:
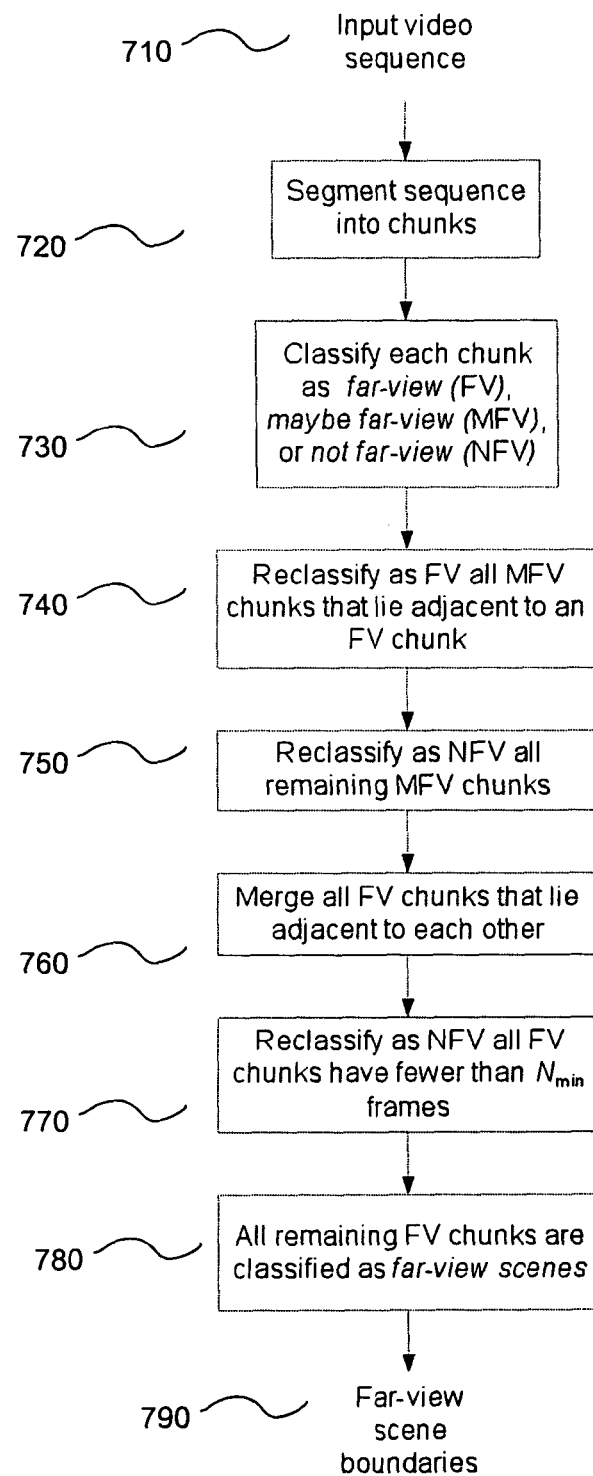
FIG. 7 is a flowchart of a method of far-view scene detection utilizing the chunk-level classifications.

FIG. 7 is a flowchart of a method 700 used in the overall far-view scene detection process. An input video sequence 710 is segmented into chunks at step 720, as described above with respect to FIG. 5. At step 730, each chunk is classified as FV, MFV, or NFV, as described with respect to FIG. 6.

At step 740, if an MFV chunk lies adjacent to an FV chunk, it is reclassified as FV. That is, if a determination regarding the field of view could not be made at step 730, the chunk will be considered far-view if it is adjacent to a far-view chunk. A chunk $[b_1\ e_1]$ is said to be adjacent to a chunk $[b_2\ e_2]$ if $b_1=e_2+1$ or $e_1=b_2-1$. In a preferred embodiment, only MFV chunks adjacent to original FV chunks are reclassified and reclassification based on adjacency to other reclassified FV chunks is not allowed.

At step 750, all remaining MFV chunks as reclassified as NFV. That is, if a determination regarding the field of view of the chunk could not be made at step 620 and the chunk is not adjacent to a chunk identified as far-view, the chunk will be assumed to not be far-view.

At step 760, the process merges all FV chunks that lie adjacent to each other into larger chunks. By merging two adjacent FV chunks [$b_1$ $e_1$] and [$b_2$ $e_2$], where $e_1=b_2-1$, C is modified by removing these two chunks and adding [$b_1$ $e_2$] in their place. The new chunk inherits the FV label of its constituent parts. This merging process is repetitive and is performed until there are no adjacent FV chunks left.

If an FV chunk has fewer than $N_{min}$ frames, it may be reclassified as NFV. In one particular embodiment, $N_{min}$ is chosen to be 30 frames. Thus, processing of short scenes may be avoided.

Finally, at step 780, all of the remaining FV chunks in C are classified as far-view scenes. The beginning and ending frames of each FV chunk indicate the boundaries 790 of the corresponding far-view scene. Similarly, all remaining NFV chunks are classified as non-far-view scenes (after merging adjacent ones as described earlier).

At the end of this process, a list of far-view scenes $S_{FV}$ and a list of non-far-view scenes $S_{NFV}$ are obtained. Each scene is represented by a pair [b e], where b is the beginning frame of the scene and e is its end frame. These scene boundaries may then be used by the object highlighting system shown in FIG. 2 to control the application of image processing techniques applicable only to certain views. The far-view scenes are sent to the object localization and enhancement modules that enhance objects of interest and generate object metadata for the object-aware encoder. The non-far-view scenes may be sent directly to the encoder to be encoded without object highlighting.

While the present invention has been described in terms of a specific embodiment, it will be appreciated that modifications may be made which will fall within the scope of the invention. For example, various processing steps may be implemented separately or combined, and may be implemented in general purpose or dedicated data processing hardware or in software. The overall complexity of the method may be reduced by relaxing the criteria for objects in the field to be considered in decision-making. For example, instead of detecting player-like objects, all objects larger than a threshold area may be considered. Also, instead of using grayscale pixel values for computing histograms during chunk segmentation, it is possible to use full-color values (e.g. RGB, YUV). Furthermore, distance measures other than the SAD may be used for comparing histograms. Instead of using threshold-based criteria for frame classification, a classifier (e.g., support vector machine) may be learned from a labeled training set of FV, MFV, and NFV frames. Furthermore, the proposed method may be applied to other sports or events with moving objects of interest. Finally, the method may be used to detect other types of scenes than far view for specialized processing.

The invention claimed is:

1. A method of processing video in a video processing system comprising the steps of:
    analyzing a plurality of images from a video signal;
    classifying the field of view of each of said plurality of images from said video signal in response to at least one size of a feature of the image;
    creating sets of sequential images from said plurality of images from said video signal based upon comparisons of metrics of adjacent images;
    classifying the field of view of each of said sets of sequential images; and selectively applying an image processing algorithm to at least those sets of sequential images representing a particular type of field of view, wherein
    said classifying the field of view of a set of sequential images comprises a statistical analysis of the classifications of the images in the set.

2. The method of claim 1 wherein each of said plurality of images from said video signal is a frame.

3. The method of claim 1 wherein said size is a length, width, or area.

4. The method of claim 1 wherein said metrics comprise color histogram data.

5. The method of claim 1 wherein classifying the field of view of an image comprises associating the image with data indicating whether the image represents a far field of view shot, may represent a far field of view shot, or does not represent a far field of view shot.

6. The method of claim 1 wherein classifying the field of view of an image comprises creating a mask representing areas of the image that may represent a playing field.

7. The method of claim 6 wherein classifying the field of view of an image comprises comparing a computed area of said mask with at least one threshold.

8. The method of claim 6 wherein classifying the field of view of an image comprises identifying and computing areas of player-like objects within the boundaries of said mask.

9. The method of claim 8 wherein classifying the field of view of an image comprises comparing the maximum computed area or median computed area of said at least one—objects with a threshold.

10. The method of claim 1 wherein said statistical analysis comprises identifying a classification pertaining to more than half of the images from the video signal in the set.

11. An apparatus for processing video in a video processing system comprising:
    means for analyzing a plurality of images from a video signal;
    means for classifying the field of view of each of said plurality of images from said video signal in response to at least one size of a feature of the image;
    means for creating sets of sequential images from said plurality of images from said video signal based upon comparisons of metrics of adjacent images;
    means for classifying the field of view of each of said sets of sequential images; and
    means for selectively applying an image processing algorithm to at least those sets of sequential images representing a particular type of field of view, wherein
    said classifying the field of view of a set of sequential images comprises a statistical analysis of the classifications of the images in the set.

12. The apparatus of claim 11 wherein each of said plurality of images from said video signal is a frame.

13. The apparatus of claim 11 wherein classifying the field of view of an image comprises associating the image with data indicating whether the image represents a far field of view shot, may represent a far field of view shot, or does not represent a far field of view shot.

14. The apparatus of claim 11 wherein classifying the field of view of an image comprises creating a mask representing areas of the image that may represent a playing field.

15. The apparatus of claim 14 wherein classifying the field of view of an image comprises comparing a computed area of said mask with at least one threshold.

16. The apparatus of claim 14 wherein classifying the field of view of an image comprises identifying and computing areas of player-like objects within the boundaries of said mask.

* * * * *